Patented Sept. 16, 1924.

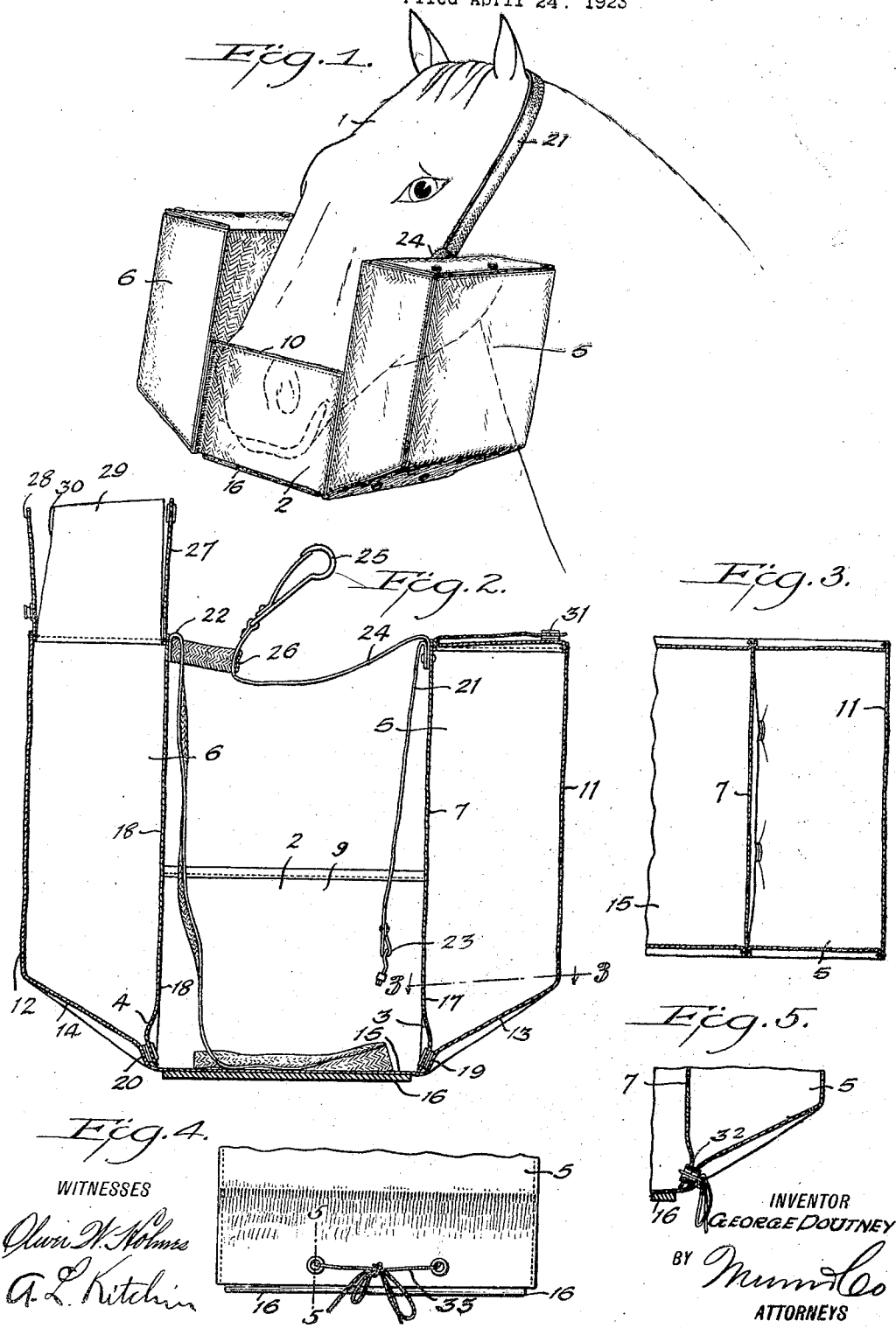

1,508,964

UNITED STATES PATENT OFFICE.

GEORGE DOUTNEY, OF BROOKLYN, NEW YORK.

FEED BAG.

Application filed April 24, 1923. Serial No. 634,344.

*To all whom it may concern:*

Be it known that I, GEORGE DOUTNEY, a citizen of Canada, and a resident of the city of New York, borough of Brooklyn, in the county of Kings and State of New York, have invented a new and Improved Feed Bag, of which the following is a full, clear, and exact description.

This invention relates to feed bags for animals and has for an object to provide a bag which may be readily mounted on the head of a horse or other animal in such a manner as to permit the horse to readily secure access to part of the feed.

Another object of the invention is to provide a feed bag in which a substantially box-shaped structure is provided into which the mouth of the animal is inserted when the bag is in use, the box-shaped structure being associated with automatically actuated magazines which act to maintain a certain supply of feed in the box.

A further object is to provide a feed bag in which a box or container is provided for the mouth of the animal whereby the animal may secure the feed in the box while permitted free breathing, the box being associated with one or more magazines for supplying additional feed as the feed in the box is consumed.

A still further object of the invention is to provide a feed bag provided with a central compartment or box and magazines on each side thereof provided with pairs of flaps acting as doors or valve members for preventing or regulating the flow of feed from the magazines to the box.

A still further object of the invention is to provide a feed bag formed with a pair of magazines provided with overlapping side and end flaps arranged to prevent accidental discharge of the feed when the bag is inverted.

In the accompanying drawing—

Figure 1 is a perspective view of the bag embodying the invention, the same being shown applied to the head of a horse.

Figure 2 is a longitudinal vertical sectional view through the bag shown in Figure 1, the covering flaps of one magazine being shown unfolded.

Figure 3 is a fragmentary sectional view through Figure 2 approximately on line 3—3.

Figure 4 is a side view of the lower part of a modified form of one of the magazines shown in Figure 1, the same illustrating a tying ligament.

Figure 5 is a sectional view through Figure 4 approximately on line 5—5.

Referring to the accompanying drawing by numerals, 1 indicates the head of a horse positioned so that its mouth will be in what may be termed the box structure 2 forming part of the bag. This box structure acts as a container for a small supply of feed which the horse may readily reach and which is augmented automatically when the flaps or valve members 3 and 4 are unfastened. It will be noted that the bag is provided with not only a box 2 arranged centrally, but magazines 5 and 6. The inner vertical walls 7 and 8 of the magazines, form the two side walls of the box 2 while auxiliary strips of cloth 9 and 10 form the end walls. The outer walls 11 and 12 of the magazines 5 and 6, extend downwardly and form the bottoms 13 and 14 of the magazines and then extend across and form the bottom 15 of the box 2. Preferably, the bottom 15, bottoms 13 and 14 and the side walls 11 and 12, are made from one piece of canvas or other good material. A stiffening and wearing member or plate 16 is riveted or otherwise rigidly secured to the bottom 15 exteriorly thereof, said plate being preferably of leather. The inner side walls 7 and 8 of the magazines merge into the flaps or valves 3 and 4 which are loose at the ends and each side up to near the points 17 and 18 whereby when the various snap fasteners 19 and 20 (which may be of any well known type) are disengaged, the feed may readily flow from the magazines into the box 2 until a certain quantity has been deposited therein whereupon the passage-way will be blocked by the feed. As the animal consumes the feed, additional feed will flow automatically until the entire contents of the magazines have been consumed.

Preferably, when the bag is in use, both of the flaps 3 and 4 are released so that the feed will flow from both magazines, though if desired, only one could be released and the feed discharged from one magazine only. Near the upper edges of the walls 7 and 8 are secured straps 21 and 22, strap 21 having a suitable buckle 23 of a type which will grip the strap 22 at any point so as to secure an exact adjustment whereby the bag may be properly suspended on any size head. In addition, a strap 24 is connected to the bag, said strap preferably having a snap hook 25 at the end adapted to be snapped to one of the rings of a saddle or to part of the harness of a horse, or under a wagon as desired when the bag is not being used. Before the hook 25 is snapped to the ring or other support, it is passed through the small strap or loop member 26 connected at both ends to the magazine 6 whereby when the hook 25 is engaging the ring on a saddle or other support, the upper inner edges of the magazines 5 and 6 will be automatically drawn together.

As indicated in Figure 2, the magazines 5 and 6 are each provided with side flaps 27 and 28 which are secured to the inner and outer walls of the magazines and which overlap each other when folded as indicated at the right in Figure 2. Each of these flaps is of substantially the same size as the opening at the top of the magazines and both act as covering members thereof. In addition, end members 29 are provided at each end of each magazine, said flaps co-acting with the flaps 27 and 28. Preferably, the end members 29 are slightly inclined at 30 so that when the end members 29 are in a closed position and the flaps 27 and 28 overlap the same, the end members 29 will not be exposed. The flap 27 is the outer flap and carries part of the snap fastener 31 (which may be of any well known type) while the other part is carried by the flap 28 whereby the flaps are locked in a closed position when the parts are arranged as shown at the right in Figure 2.

When the device is to be used, the snap member 25 is disconnected and the snap members 19 and 20 are also disconnected so that the feed may flow in the box 2. The strap 22 is then placed over the head of the horse as shown in Figure 1 and properly secured by the buckle 23. The snap fasteners 19 and 20 may be secured together again at any time, as for instance, when half of the feed in the respective magazines has been discharged so that two meals may be readily carried at one time.

Under some circumstances, the snap fasteners 19 and 20 may be eliminated and a modified structure used as shown in Figures 4 and 5, namely, eyelets 32 which accommodate ligaments 33, which ligaments may be ordinary cord threaded through and drawn together and tied. To release the flaps 3 and 4, the cord 33 may be merely untied and the bag given a shake so as to loosen up the parts whereas the fasteners 19 and 20 necessitate the placing of the hand into the box 2 and also necessitates the pulling of the snaps to an open position. Each of the compartments 5 and 6 is filled independently from the top and then the respective flaps 27 to 30 are folded and the parts locked together by the snap fasteners 20. This arrangement of folds makes the bag substantially waterproof as well as proof against spilling of the feed.

What I claim is:—

1. A feed bag, comprising means forming an open topped container for receiving the mouth and nose of an animal when feeding, means forming a magazine of canvas on each side of the container, each of said magazines being formed with a canvas flap at the lower part thereof adjacent the container, fastening means for normally holding said flaps closed, and a supporting member secured to said magazines positioned to fit over the top of the animal's head which is using the bag.

2. A feed bag, comprising means forming a pair of magazines adapted for containing an extra supply of feed, means co-acting with said magazines for presenting a container open at the top whereby the horse or other animal may readily have access thereto, means for suspending the bag on the head of the horse, and means for suspending the bag when not in use, said last named means comprising a looped member connected with one magazine, a strap having a hook on the end connected to the other magazine, said strap being threaded through said looped member for causing the upper ends of the magazines to be drawn toward each other when the weight of the bag is supported on said hook member.

GEORGE DOUTNEY.